Figure 1:
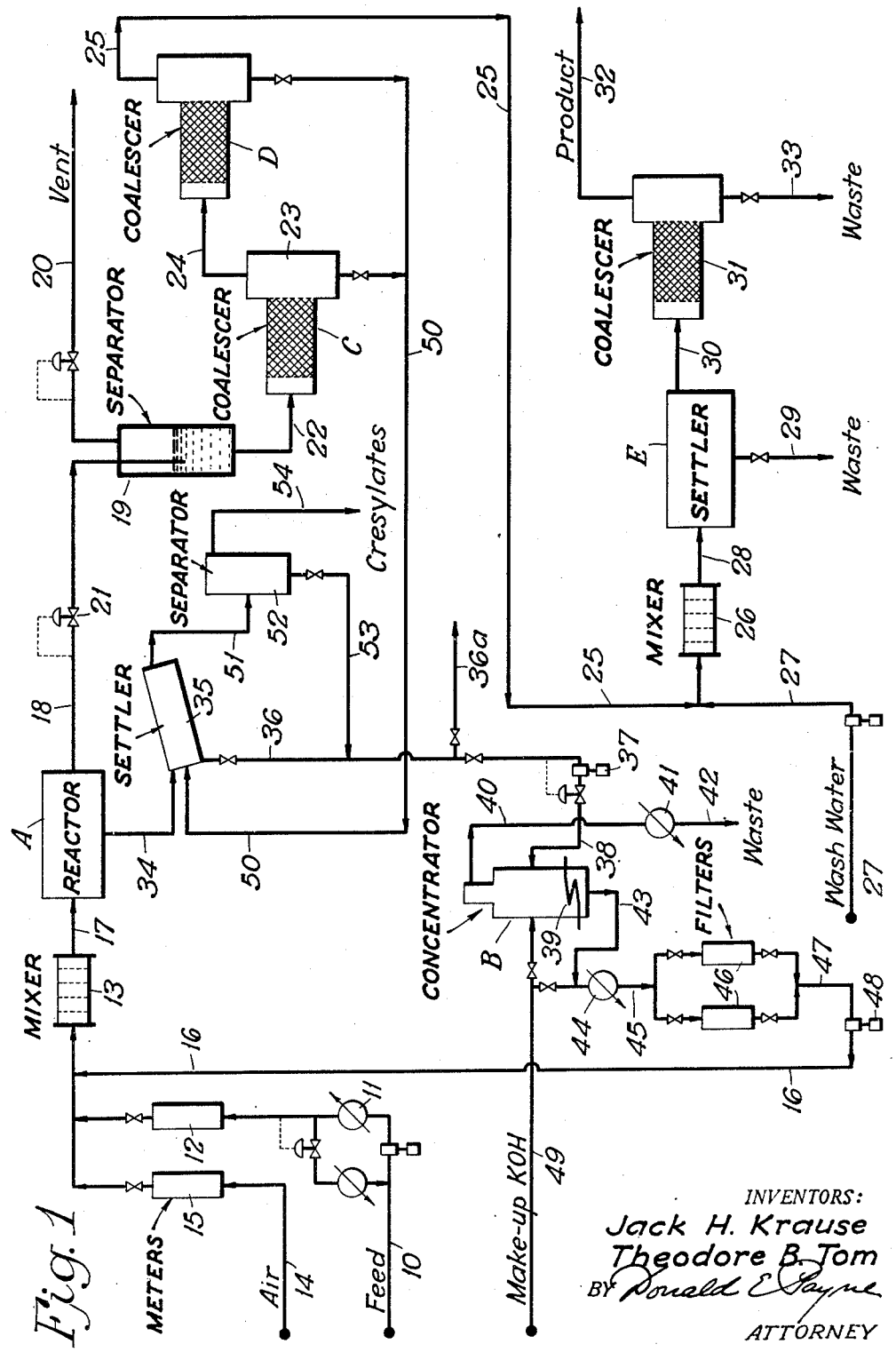

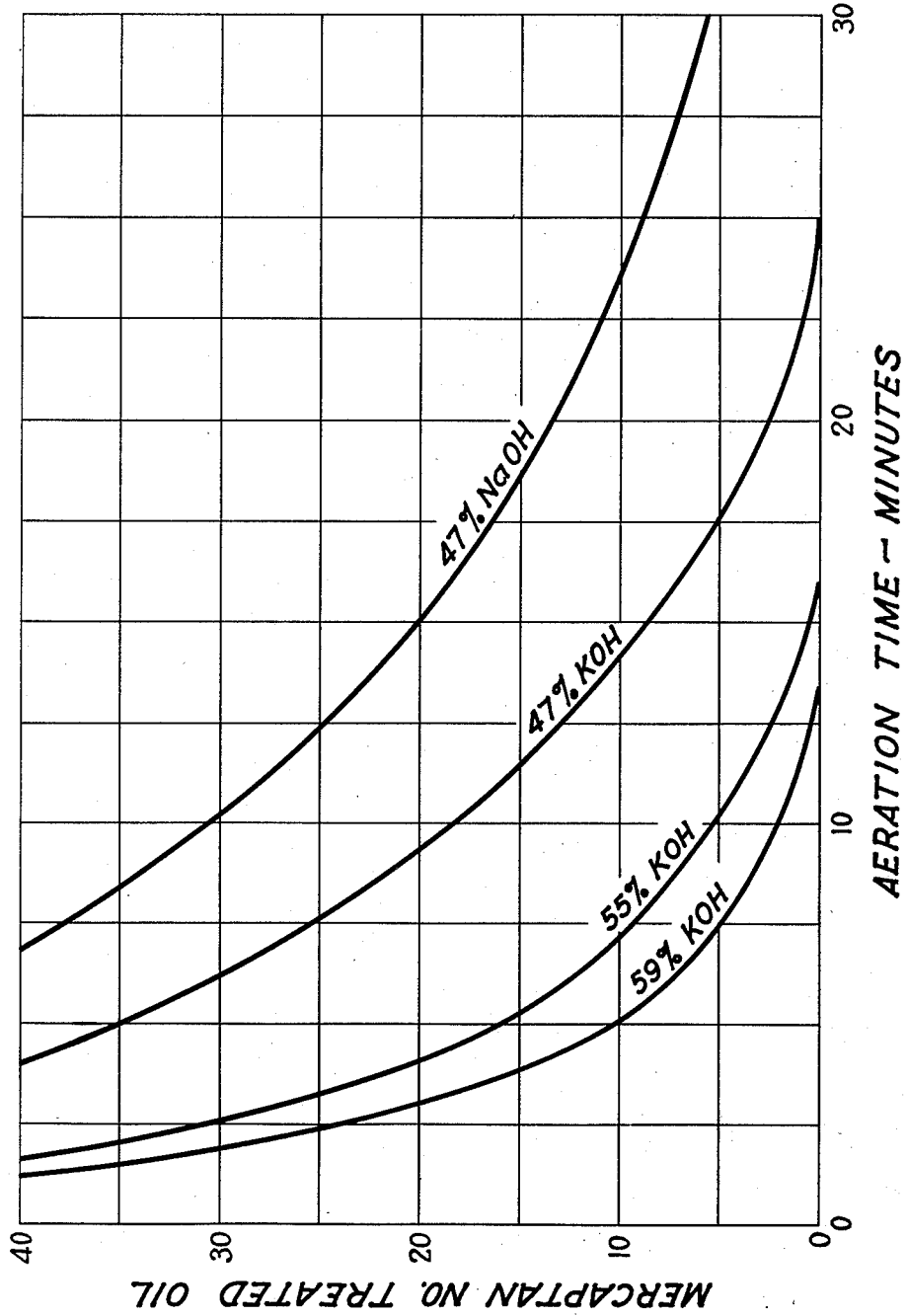

Patented July 14, 1953

2,645,602

UNITED STATES PATENT OFFICE 2,645,602

SWEETENING HYDROCARBON DISTILLATES

Theodore B. Tom and Jack H. Krause, Hammond, Ind., assignors to Standard Oil Company, Chicago, Ill., a corporation of Indiana Application March 17, 1950, Serial No. 150,161

6 Claims. (Cl. 196—29)

This invention relates to the refining of sour hydrocarbon distillates, such as heavy naphtha, kerosene, diesel oil, heater oil and furnace oil, which are derived from the distillation of crude or from cracking processes, either thermal or catalytic. More particularly the invention relates to a method of treating such stocks with concentrated potassium hydroxide solutions and air or free oxygen to remove mercaptans therefrom.

It has heretofore been the practice to treat sour mercaptan-containing hydrocarbon distillates with alkaline solutions of various sorts to remove the mercaptans. Where low molecular weight mercaptans are involved as in the case of low-boiling distillates such as light naphthas, removal of mercaptans can be effected by simply washing with caustic alkali, e. g., caustic soda or caustic potash. For this purpose it is usually the practice to employ a caustic soda solution of about 10 to 20 percent concentration. The caustic solution can be regenerated by steaming or air blowing to distil off the mercaptans or convert them to insoluble disulfides which can be separated from the caustic solution.

In the case of higher boiling stocks, particularly heater oil and furnace oils, the removal of the mercaptans is much more difficult because of their increased oil solubility or higher oil-water partition coefficient due to their higher molecular weight. Numerous methods have been proposed and practiced for removing heavy mercaptans of the type found in these higher boiling distillates. Alkaline solutions containing organic solvents or so-called "solutizers" have been employed. Caustic-methanol solutions have a similar action. Chemical reagents which oxidize the mercaptans to disulfides in the presence of the oil have also been extensively employed. Among these are the familiar alkaline sodium plumbite or doctor solution, alkaline hypochlorite solutions, etc. Some attempts have been made to remove mercaptans from petroleum distillates by treating with anhydrous caustic in the form of a dry powder or in solution or suspension in an organic solvent such as methanol. When operating in this way, however, serious color formation has resulted especially where the treatment was conducted at elevated temperatures, for example 150° F. and upwards. It has been found that to prevent color formation under these conditions it has been necessary to carefully exclude oxygen or air.

An object of this invention is to remove mercaptans from sour hydrocarbon oils with a minimum of color degradation. Another object is to remove mercaptans from sour hydrocarbon distillates by the use of air and highly concentrated aqueous KOH solutions. A particular object is to reduce the amount of mercaptans in sour hydrocarbon distillates which boil above the gasoline range with a minimum of color degradation or formation of oil-soluble color bodies by the use of 50–60% aqueous KOH solutions and air at a reaction temperature of about 100–125° F.

Figure 2:
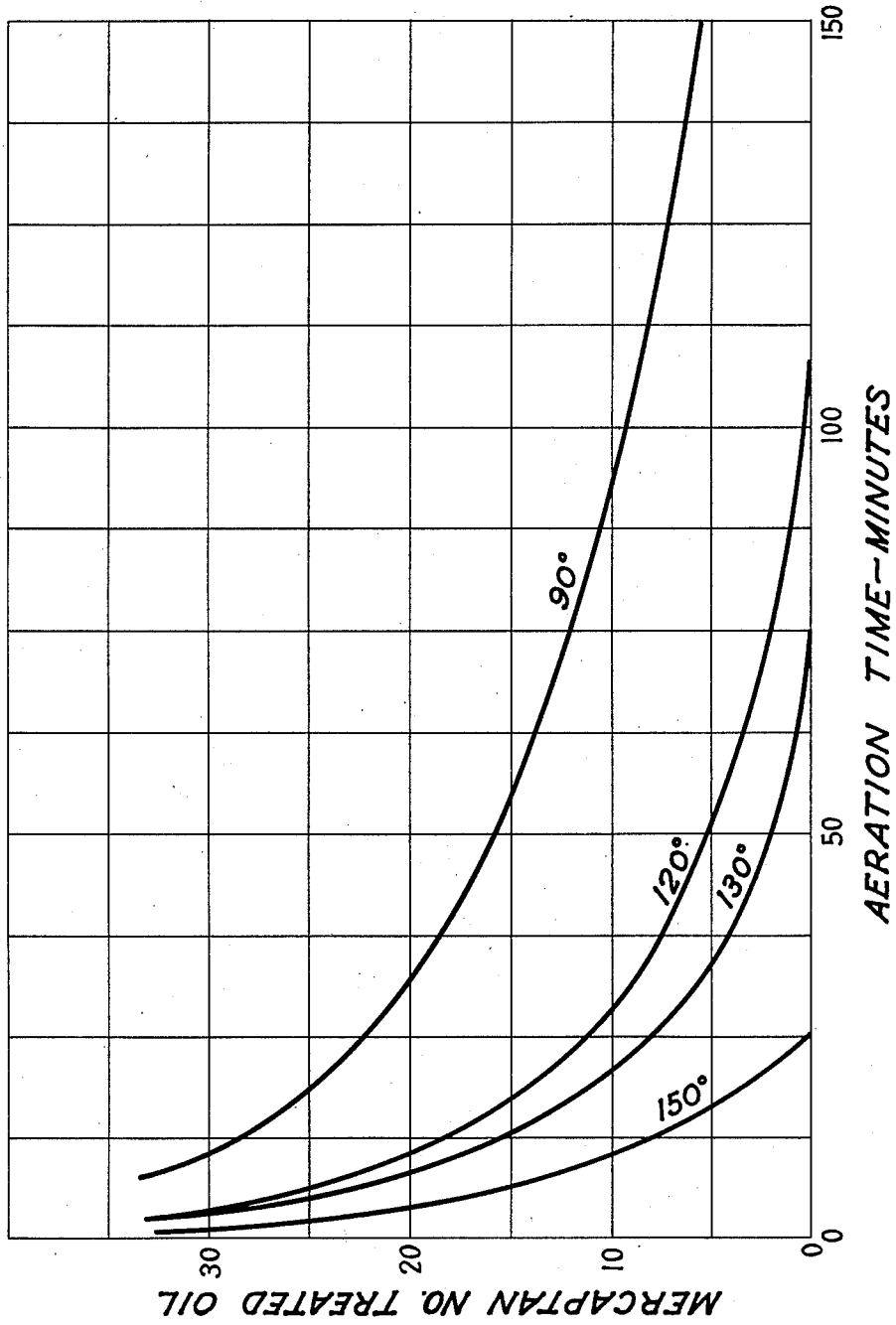
Figure 3:
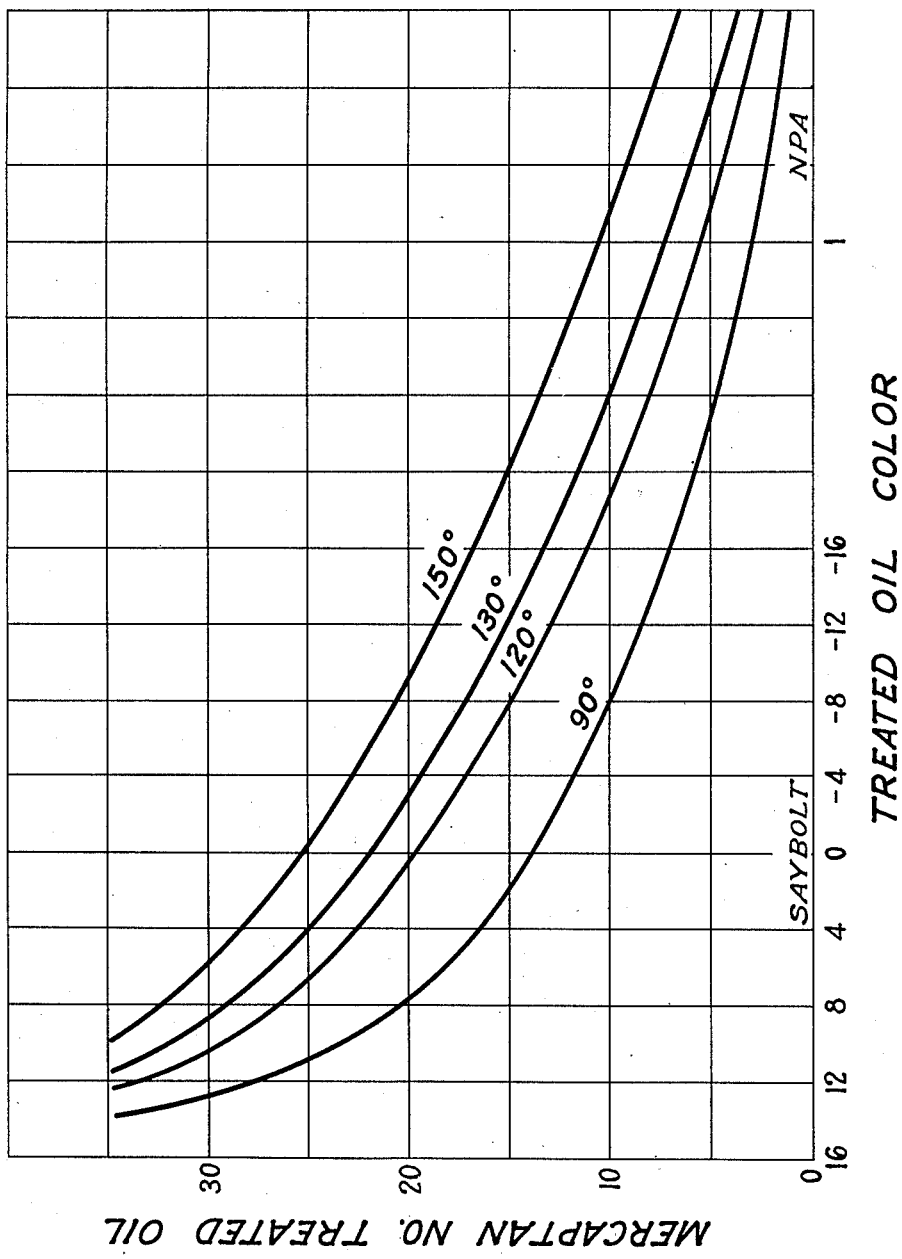

The invention is illustrated by the drawings which form a part of this specification and in which:

Figure 1 is a schematic diagram of an apparatus suitable for carrying out the process, and Figures 2, 3 and 4 are graphs of data illustrating the results obtained in the process.

It has been discovered that mercaptans can be removed from sour hydrocarbon distillates, even of the distillate fuel boiling range, i. e., 350–650° F., without serious color formation by treating with a controlled amount of air or oxygen in the presence of an aqueous potassium hydroxide solution having a concentration in the range of about 50 to 60 per cent by weight at a temperature of about 100–125° F. (but high enough to prevent solidification of caustic), at atmospheric or superatmospheric pressure. Under these conditions the mercaptans are converted to relatively odorless disulfides and the formation of objectionable color bodies is held to a minimum. The oil refined in this manner has also been found to be satisfactory from the standpoint of its burning characteristics when employed in sleeve-type burners. The amount of oxygen employed either as air or commercial oxygen is preferably about one and one-half to two and one-half times that theoretically required for converting the mercaptans present to disulfides.

In the operation of our process, it is important to control the temperature within the range of about 100 to 125° F. The lower temperatures permit the mercaptan oxidation to proceed with the minimum amount of color formation. The higher temperatures permit shorter reaction times but tend to produce a more highly colored product. The effect of temperature upon the rate of mercaptan removal is shown graphically in Figure 2. These data were obtained using a 500 ml. sample of a West Texas heater oil having a Saybolt color of +15 and a mercaptan number of 58; the sample was contacted with 1 volume percent of 55% aqueous KOH solution and 4.85 cu. ft. of air per hour. At 90° F. the aeration time to produce an oil of 5 mercaptan No. is about 150 minutes; to produce an oil that is substantially sweet the aeration time is over 250 minutes—a commercial impractical length of time.

Figure 2 indicates that the lowest temperature at which a satisfactory oil is obtained in a practical time is about 100° F.

Higher temperatures have been found to increase color formation. The cause of color formation is not fully understood but it is thought to be due to the oxidation of phenolic substances contained in the high sulfur oils. The effect of temperature on color formation is shown graphically in Figure 3. In order to obtain a treated oil of about .5 mercaptan number with a color of about 1 NPA, the reaction temperature must be held below about 125° F. While treating at about 90° F. results in the best colored oil, the very long contact time necessary to attain a satisfactory mercaptan number renders operation at this temperature impractical.

An oil that is highly colored can be decolorized by any of several well-known methods, for example, treating with 98% sulfuric acid or percolation through fuller's earth. However, the most economical method normally is to conduct the sweetening process in such a manner that an oil of the proper color is produced. The treatment of the sour hydrocarbon oil at a temperature between 100° F. and 125° F., preferably about 110° F., will accomplish this desired object.

It is desirable to separate the oil from the caustic solution after a contact time of about 35 to 100 minutes depending on the treating temperature, in order to avoid color formation and a contact time greater than about two hours has been found to darken the oil excessively.

The ratio of caustic solution to oil may be varied over a range from 0.5 percent by volume to 10 to 15 percent by volume, although about 5 percent by volume has been found to give best results in the case of heater oil from West Texas crude. When employing only 1 percent KOH solution, the problem of separating the spent KOH solution from the oil is more difficult than when larger volumes of solution are used. Coalescing the treated oil to separate the oil and KOH solution is particularly valuable in the case of low KOH-oil ratios.

Attempts to use the cheaper caustic soda instead of KOH for sweetening fuel oil distillates were unsuccessful. In comparison with NaOH solution, KOH gives a faster reaction and a product of satisfactory mercaptan number before objectionable color formation develops. The KOH solution also separates from the oil more readily whereas the NaOH becomes emulsified or suspended in the heavy oil and is difficult to remove, even in the subsequent water washing operation.

Figure 4 illustrates the superior action of KOH in comparison with NaOH solutions. The aeration time for reduction in mercaptan number is considerably greater for NaOH solution of the same concentration. Thus the aeration time required to reduce the mercaptan number from 70 to 5 was approximately 32 minutes with 47 percent NaOH and only 18 minutes with KOH solution of the same concentration.

Figure 4 also shows the effect of concentration on rate of mercaptan oxidation and it will be noted that there is a tendency for the oxidation to slow down as lower numbers are reached and the rate decreases most markedly with the lower KOH concentrations. Thus 47 percent KOH takes 22 minutes to reach a mercaptan number of about 1, whereas 55 percent KOH permitted 1 mercaptan number to be reached in 14 minutes. These data were obtained with a West Texas heater oil having a mercaptan number of 70, contacted with air and 1 percent by volume of the KOH solution. The temperature of contacting was 150° F. and the rate of air input was 4.85 cubic feet per hour into a 500 ml. sample. This temperature was used because it is favorable for mercaptan removal with caustic soda; at the preferred temperature of 110° F. caustic soda is ineffective.

The odor of the oil treated by the KOH-air oxidation process has been found to be satisfactory for marketing requirements if the oxidation is carried to a point where the mercaptan number is about 5. (The mercaptan number is the number of milligrams of mercaptan sulfur per 100 ml. of oil, usually determined by titration with a standardized copper solution.) By employing about 5 volume percent of KOH solution (55% concentration) based on oil treated, mercaptan numbers have been reduced to about 5 and treated products of good odor and color have been obtained with a good color stability and excellent burning qualities.

This invention is of particular interest in the sweetening of cracked stocks. Normally, cracked stocks which have been sweetened by the previously known methods are not color stable. Our process results in oil that is substantially unchanged in color when exposed to a temperature of 200° F. for 20 hours. A thermally cracked furnace oil of about 1 NPA color was treated at about 100° F. with 1 volume percent of a 55% KOH solution until a product of about 5 mercaptan number was obtained which treated oil had a color of about 1.5 NPA. After 20 hours at 200° F., the sour oil was about 3.5 NPA color with a formation of sediment, while the treated oil was about 2 NPA color and sediment-free.

A fuller understanding of the treating process will be obtained from Figure 1 wherein the principal reaction vessel is indicated by A and the used KOH reconcentrator by B. Coalescers C and D are provided for more complete removal of caustic from the oil and E is a settler for removing wash water from the treated oil. The charge stock, typically a thermally cracked furnace oil, may be given a preliminary wash with an alkaline solution, such as sodium hydroxide or carbonate, to remove hydrogen sulfide if this is present in the oil. The sour oil is introduced by line 10 and the temperature is adjusted by heater 11 to a satisfactory point, such as 110° F. After flowing through meter 12 the sour oil passes to mixer 13 which is indicated to be of the orifice type. Air is introduced by line 14 and flows through meter 15 to mixer 13. An aqueous KOH solution of about 55% concentration and about 5% by volume of the oil is introduced by line 16 to mixer 13. The KOH solution, the air and the sour oil are thoroughly mixed in mixer 13, a suitable residence time being about 1 minute.

The resulting mixture flows by line 17 to reactor A where partial separation of KOH solution takes place. A suitable contact time is on the order of 40–70 minutes. Oil and unused air pass by line 18 to air separator 19 from which the air is discharged by line 20. It is preferred to maintain the reactor A under pressure, for example about 100 p. s. i. g., reducing the pressure by valve 21 to about 15 p. s. i. g. to facilitate separation of air in separator 19. The use of pressure with air increases the rate of oxidation, and pressures in the range of 25 to 200 p. s. i. g. are satisfactory. Where oxygen is used, superatmospheric pressure is not ordinarily required. From separator 19 the oil flows by line 22 to coalescer C which is packed with a fibrous or finely granular material such as glass wool, rock wool, sand, etc., providing an extensive surface for the removal of colloidally suspended KOH solution from the oil. The coalescer may be a horizontal drum packed with glass wool, as indicated, connected with settling chamber 23, or it may be a packed vertical drum. By effecting a more rapid and complete removal of KOH, the coalescer serves to arrest the development of color.

From coalescer C the oil flows by line 24 to a second coalescer D. The residence time of the oil in the coalescers is suitably about 5 to 10 minutes. From coalescer D the oil flows by line 25 to water mixer 26, water being introduced into the oil stream by line 27. Mixer 26 of the orifice type is shown, although any suitable efficient mechanical mixer may be substituted therefor. The amount of water introduced may suitably be about 5 to 10 percent of the volume of the oil. The water-oil mixture is conducted by line 28 to water settler E from which waste water is withdrawn by line 29. Washed oil flows by line 30 to water coalescer 31, the finished oil being discharged from the system by line 32. Waste water from coalescer is discharged by line 33.

From reactor A, spent KOH is withdrawn by line 34 to settler 35 where potassium cresylates are allowed to collect as an upper layer. The separated KOH is withdrawn by line 36 and pump 37 and thence flows by line 38 to reconcentrator B where it is heated by submerged steam coil 39 to drive off water which tends to accumulate in the system, particularly as a by-product of the sweetening reaction. Water eliminated as vapor is passed by line 40 to condenser 41 and is discharged from the system by line 42. The reconcentrated KOH flows by line 43 to cooler 44 and thence by line 45 to KOH solution filters 46 which remove potassium carbonate and any other insoluble products which may collect in the reagent. The KOH solution then flows by line 47 and pump 48 back to mixer 13 by line 16. Make-up KOH is supplied to the system from time to time by line 49 as needed. By operating concentrator B under reduced pressure, e. g., 5 p. s. i. a., the temperature can be held below about 280° F. thereby largely avoiding decomposition of mercaptides of $K_2S$ which is undesirable because it separates and clogs the system and results in a loss of KOH.

From the coalescers C and D separated KOH solution is conducted by line 50 to separator 35. The cresylate layer from separator 35 is conducted by line 51 to separator 52 which may be a storage tank providing an extended time for settling out aqueous caustic. The recovered KOH is conducted periodically by line 53 to the KOH line 36. If desired separator 52 can be provided with suitable means for heating the cresylates and thereby facilitating the separation of the KOH. The settled potassium cresylates are discharged from the system by line 54.

While a particular system for using the invention has been described in considerable detail, many modifications and alternative procedures and conditions will be apparent from the above description to those skilled in the art.

The use of a copper catalyst in the above described treating process is claimed in our copending application No. 141,391, filed January 31, 1950, now Patent No. 2,591,946.

We claim:

1. The process of removing mercaptans from a sour hydrocarbon distillate boiling above the gasoline range without formation of excessive color therein, which comprises intimately contacting said distillate with about 1 to 15 percent by volume of an aqueous solution of KOH having a concentration of about 50 to 60 weight percent, introducing a gas containing an amount of free oxygen about stoichiometrically equivalent to the amount of mercaptans present in said distillate into the mixture of distillate and KOH, maintaining the temperature of contacting at about 100 to 125° F. until there has been a substantial reduction in mercaptan content and separating spent KOH solution and associated reaction products from the treated oil.

2. The process of sweetening a sour hydrocarbon distillate without formation of excessive color therein which comprises intimately contacting said distillate with about 5 to 10 percent by volume of an aqueous solution of KOH having a concentration of about 50 to 60 percent, introducing into the reaction mixture air containing an amount of oxygen stoichiometrically equivalent to about one and one-half to two and one-half times the amount of mercaptans present in said distillate, maintaining said reaction mixture highly agitated and at a temperature of about 100 to 125° F. until the mercaptan number of said distillate is reduced to not more than about 5, then separating spent KOH solution and associated reaction products from the treated oil.

3. The process of claim 2 wherein the time of contact between said distillate and said KOH solution is about 35–100 minutes.

4. The process of treating a sour virgin heater oil distillate containing a large amount of mercaptan sulfur without materially impairing the color stability thereof, which process comprises intimately contacting said distillate with about 5 percent by volume of a concentrated potassium hydroxide solution of about 50 to 60 percent concentration and with added free oxygen in an amount stoichiometrically equivalent to about one and one-half to two and one-half times the amount of mercaptans present in said distillate, continuing said contacting at a temperature in the range of about 100 to 125° F. under a pressure in the range of atmospheric to 200 pounds per square inch for a time between about 35 and 100 minutes, then separating spent potassium hydroxide solution with reaction products contained therein from the treated oil, separating potassium cresylates from the withdrawn solution, then subjecting the separated KOH solution to distillation at low pressure and at a temperature not exceeding about 300° F. for removing water therefrom, and returning the concentrated caustic solution for contacting with additional amounts of said distillate.

5. The process of claim 1 wherein said distillate is a sour virgin heater oil distillate.

6. The process of claim 4 wherein said aqueous KOH solution is substantially saturated at the temperature of contacting.

THEODORE B. TOM.
JACK H. KRAUSE.

References Cited in the file of this patent

UNITED STATES PATENTS

| Number | Name | Date |
|---|---|---|
| 1,957,794 | Morrell et al. | May 8, 1934 |
| 2,390,296 | Gilbert | Dec. 4, 1945 |
| 2,481,570 | Champagnat | Sept. 13, 1949 |
| 2,547,181 | Tom et al. | Apr. 3, 1951 |
| 2,560,374 | Shmidl | July 10, 1951 |